US012578629B2

(12) United States Patent
Lee et al.

(10) Patent No.: US 12,578,629 B2
(45) Date of Patent: Mar. 17, 2026

(54) CAMERA MOUNT ASSEMBLY AND METHOD FOR ASSEMBLING CAMERA MOUNT

(71) Applicant: HANWHA TECHWIN CO., LTD., Seongnam-si (KR)

(72) Inventors: Byeong Ho Lee, Seongnam-si (KR); Chang Yeon Kim, Seongnam-si (KR); Byung Moon Jun, Seongnam-si (KR)

(73) Assignee: HANWHA VISION CO., LTD., Seongnam-si (KR)

(*) Notice: Subject to any disclaimer, the term of this patent is extended or adjusted under 35 U.S.C. 154(b) by 845 days.

(21) Appl. No.: 17/856,188

(22) Filed: Jul. 1, 2022

(65) Prior Publication Data

US 2023/0205060 A1     Jun. 29, 2023

(30) Foreign Application Priority Data

Dec. 27, 2021     (KR) ........................ 10-2021-0188196

(51) Int. Cl.
*G03B 17/56*          (2021.01)
(52) U.S. Cl.
CPC ................................. *G03B 17/561* (2013.01)
(58) Field of Classification Search
CPC ...... G03B 17/56; G03B 17/561; F16M 11/06;
F16M 11/08; F16M 11/2007; F16M 11/2014; F16M 13/02; F16M 13/027;
F16M 2200/021; F16M 2200/024; H04N
7/18; G08B 13/19617; G08B 13/19619;
G08B 13/19632
See application file for complete search history.

(56) References Cited

U.S. PATENT DOCUMENTS

2012/0236563 A1* 9/2012 Breidenassel ........... F21V 17/14
362/249.02
2016/0061435 A1* 3/2016 Lin ......................... F21V 29/74
361/728

FOREIGN PATENT DOCUMENTS

JP          4343651 B2    10/2009
JP          3169716 U      8/2011
JP       2017058484 A  *   3/2017

* cited by examiner

*Primary Examiner* — Stephanie E Bloss
*Assistant Examiner* — Fang-Chi Chang
(74) *Attorney, Agent, or Firm* — Sughrue Mion, PLLC

(57) ABSTRACT

A camera mount assembly includes a base configured to be fixed to a support surface, wherein the base includes a first circuit board therein; a mount configured to have a camera mounted thereon, wherein the mount is further configured to rotate about a common axis with respect to the base, and the mount includes a second circuit board therein; a guide frame on one from among the mount and the base, the guide frame including a cam profile; and a cam bolt fixed to the other from among the mount and the base, wherein, based on the mount rotating with respect to the base, one side of the cam bolt is configured to move along the cam profile formed in the guide frame such that a size of a gap between the base and the mount varies.

18 Claims, 17 Drawing Sheets

Figure 9:
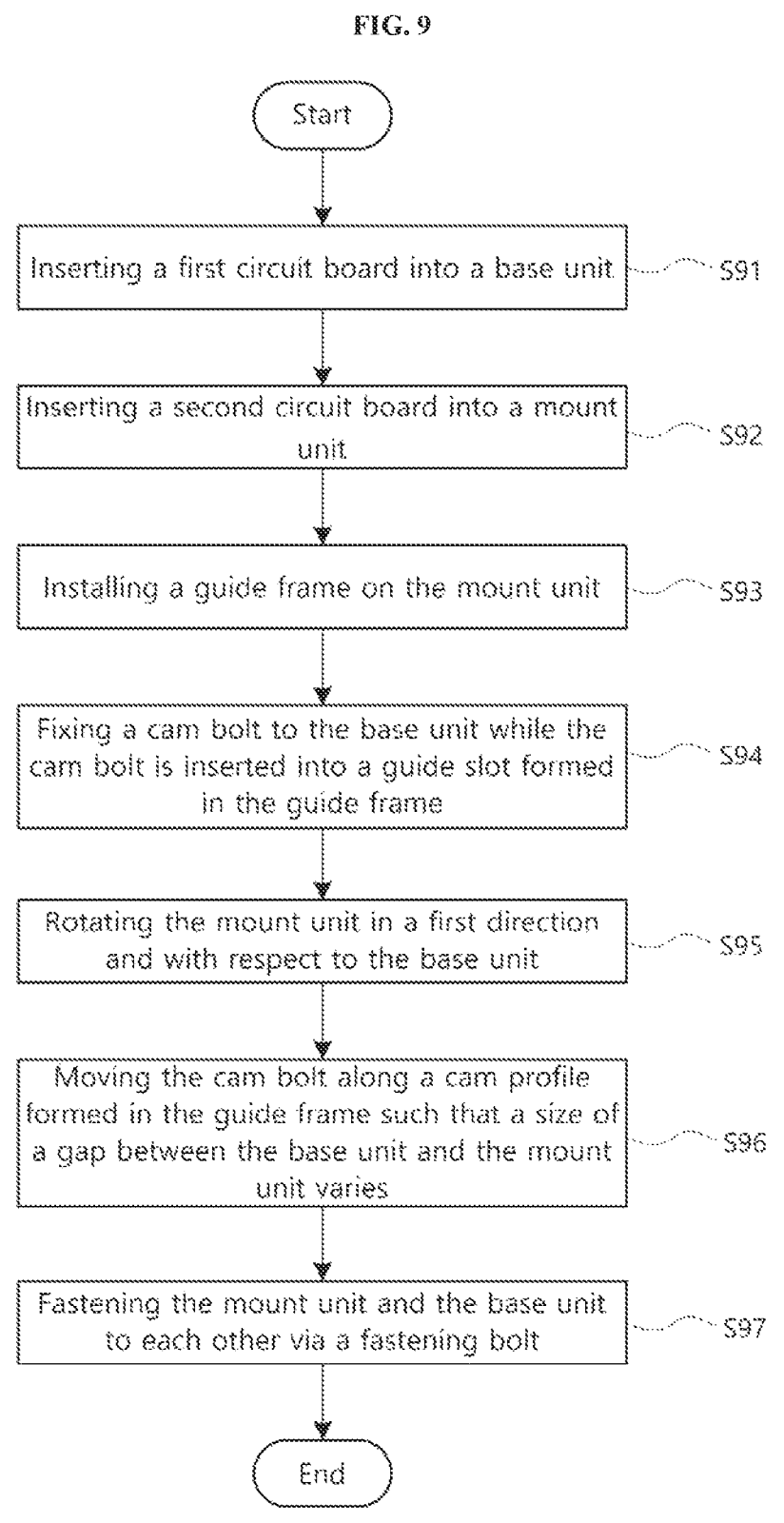

Start

Inserting a first circuit board into a base unit — S91

Inserting a second circuit board into a mount unit — S92

Installing a guide frame on the mount unit — S93

Fixing a cam bolt to the base unit while the cam bolt is inserted into a guide slot formed in the guide frame — S94

Rotating the mount unit in a first direction and with respect to the base unit — S95

Moving the cam bolt along a cam profile formed in the guide frame such that a size of a gap between the base unit and the mount unit varies — S96

Fastening the mount unit and the base unit to each other via a fastening bolt — S97

End

CAMERA MOUNT ASSEMBLY AND METHOD FOR ASSEMBLING CAMERA MOUNT

CROSS-REFERENCE TO RELATED APPLICATION

This application claims priority from Korean Patent Application No. 10-2021-0188196 filed on Dec. 27, 2021, in the Korean Intellectual Property Office, and all the benefits accruing therefrom under 35 U.S.C. 119, the contents of which in its entirety are herein incorporated by reference.

BACKGROUND

1. Field

Embodiments of the present disclosure relate to a camera mount assembly on which a camera is mounted, and more particularly, to a camera mount assembly in which a camera is easily installed thereon.

2. Description of Related Art

In general, a surveillance camera and other electronic devices may be mounted on a ceiling or a mount surface which is at a high vertical level or an inaccessible mount place. When the surveillance camera and other electronic devices is to be physically connected to a telecommunications network and attached to the mount surface via screws or the like, an installation person may need to hold heavy and expensive equipment with one hand in a balanced manner and connect a network cable to the electronic device with the other hand. This situation is undesirable in terms of ergonomic work and in terms of efficiency. Similar inconvenience may occur when physically separating the electronic device from a communication network temporarily for maintenance.

In particular, a base unit (e.g., set) fixed to a support surface (e.g., ceiling, wall, etc.) may be combined with an installation unit (e.g., a mount) on which a camera is mounted. Depending on whether an installation direction is a forward direction or a reverse direction, a load felt by the installation person varies.

In general, this load felt by the installation person when installing the camera in the reverse direction in which the installation unit is mounted below the base unit is larger than that when installing the camera in the forward direction in which the installation unit is located above the base unit. In this case, since a weight of the base unit and an elastic force of a spring installed therein act as a load, it may be difficult to install the camera thereon. Therefore, two installation persons may be required. One installation person may hold the base unit while the other installation person installs the camera on the base unit.

Further, when the installation person holds the base unit and assembles the installation unit therewith, a panning part of the camera may turn, so that installation difficulty is quite great.

SUMMARY

Embodiments of the present disclosure provide a camera mount assembly in which a camera may be easily installed thereon by only one person.

Embodiments of the present disclosure provide a camera mount assembly in which a separate electrical connection process may be omitted in a camera installation process.

According to embodiments of the present disclosure, a camera mount assembly is provided. The camera mount assembly includes: a base configured to be fixed to a support surface, wherein the base includes a first circuit board therein; a mount configured to have a camera mounted thereon, wherein the mount is further configured to rotate about a common axis with respect to the base, and the mount includes a second circuit board therein; a guide frame on one from among the mount and the base, the guide frame including a cam profile; and a cam bolt fixed to the other from among the mount and the base, wherein, based on the mount rotating with respect to the base, one side of the cam bolt is configured to move along the cam profile formed in the guide frame such that a size of a gap between the base and the mount varies.

According to one or more embodiments of the present disclosure, based on the mount rotating in a first direction with respect to the base, the mount reaches an assembled position at which the mount is configured to be assembled to the base, and wherein, based on the mount rotating in a second direction opposite to the first direction, the mount reaches a disassembled position at which the mount is configured to be disassembled from the base.

According to one or more embodiments of the present disclosure, the assembled position is a position at which the mount and the base are in a preliminary assembly state in which the gap is present between the base and the mount, and while at the assembled position, the mount and the base are configured to be fastened to each other via a fastening bolt, such that the gap between the base and the mount is removed, thereby achieving a completely assembled state.

According to one or more embodiments of the present disclosure, the guide frame is fastened to the mount via a screw.

According to one or more embodiments of the present disclosure, the cam bolt includes: a cam portion configured to move while in contact with the cam profile; a screw thread portion fastened to the base; and a shaft portion connecting the cam portion and the screw thread portion to each other.

According to one or more embodiments of the present disclosure, the camera mount assembly further includes a bias spring that surrounds the cam bolt such that both ends of the bias spring are supported on a bottom face of the guide frame and one side of the base, respectively, wherein the bias spring is configured to provide a biasing force to the base and the guide frame such that, when the mount rotates with respect to the base during at least one portion of rotation of the mount, the gap between the mount and the base is maintained due to the biasing force.

According to one or more embodiments of the present disclosure, the camera mount assembly further includes a ring member surrounding the shaft portion of the cam bolt, the ring member configured to maintain in contact with the bottom face of the guide frame when the mount rotates with respect to the base, and wherein one end of the bias spring is supported on the ring member.

According to one or more embodiments of the present disclosure, a guide groove is formed on an outer circumferential face of the mount and extends along the outer circumferential face, and a protrusion is formed on an outer circumferential face of the base, and wherein the protrusion is configured to move along the guide groove based on the mount rotating with respect to the base, such that the protrusion visually indicates an amount of rotation of the mount.

According to one or more embodiments of the present disclosure, a direction indicator is formed at the guide groove and indicates the first direction and the second direction.

According to one or more embodiments of the present disclosure, the guide frame includes a rim shape extending along a circumferential direction of the camera mount assembly, and a guide slot within the rim shape, and wherein a cam portion of the cam bolt is within the guide slot and configured to move within the guide slot.

According to one or more embodiments of the present disclosure, the cam profile is formed on at least one from among two inner walls that define the guide slot.

According to one or more embodiments of the present disclosure, the cam profile includes: a lowest point position corresponding to a disassembled position at which the mount is configured to be disassembled from the base; an inclined ascending zone extending in an inclined, ascending manner from the lowest point position; a slope constant zone extending after the inclined ascending zone and having a constant slope; and a final position corresponding to an assembled position at which the mount is configured to be completely assembled to the base, the final position extending in an abruptly descending manner from the slope constant zone.

According to one or more embodiments of the present disclosure, based on the cam portion moving within the cam profile to a higher position of the cam profile, the gap between the mount and the base becomes smaller.

According to one or more embodiments of the present disclosure, the first circuit board includes a first connector configured to provide an electrical connection to the first circuit board, the second circuit board includes a second connector configured to provide an electrical connection to the second circuit board, wherein, based on the mount being at the disassembled position, the first connector and the second connector are misaligned with each other, wherein, based on the mount being at the assembled position, the first connector and the second connector are aligned with each other but are not electrically connected to each other, and wherein, based on the mount being at the assembled position, and the mount and the base are fastened to each other via a fastening bolt, the first connector and the second connector are electrically connected to each other.

According to one or more embodiments of the present disclosure, the first circuit board is fixed to the base and is housed in a first board housing, and the second circuit board is fixed to the mount and is housed in a second board housing.

According to one or more embodiments of the present disclosure, the first connector and the second connector are configured to be electrically connected to each other via a pin plate disposed between the first connector and the second connector.

According to one or more embodiments of the present disclosure, based on the mount and the base being fastened to each other by the fastening bolt, the pin plate becomes connected to the second connector such that the first connector and the second connector become electrically connected to each other.

According to one or more embodiments of the present disclosure, a gasket is formed on at least one from among the first board housing and the second board housing, and wherein, based on the mount and the base being fastened to each other by the fastening bolt, the first board housing and the second board housing are brought into in close contact with each other, with the gasket therebetween, such that the gasket prevents the first connector and the second connector from being exposed to an environment outside of the first board housing and the second board housing.

According to embodiments of the present disclosure, a method for assembling a camera mount assembly is provided. The method includes: inserting a first circuit board into a base, wherein the base is configured to be fixed to a support surface; inserting a second circuit board into a mount, wherein the mount is configured to have a camera mounted thereon and the mount is configured to rotate about a common axis with respect to the base; installing a guide frame on the mount; fixing a cam bolt to the base and inserting the cam bolt into a guide slot formed in the guide frame; and rotating the mount in a first direction with respect to the base, wherein, during the rotating, one side of the cam bolt moves along a cam profile formed in the guide frame such that a size of a gap between the base and the mount varies.

According to one or more embodiments of the present disclosure, the method further includes fastening the mount and the base to each other via a fastening bolt after the mount is rotated to a preliminary assembly state, wherein the gap is present between the mount and the base in the preliminary assembly state, and wherein, based on the mount and the base being fastened to each other via the fastening bolt, the gap is removed, thereby achieving a completely assembled state.

According to the camera mount assembly according to the present disclosure, one installation person may easily install the camera on the camera mount assembly.

A camera mount assembly according to embodiments of the present disclosure, may achieve electrical connection and waterproof/dustproof at a same time when the installation process has been completed.

BRIEF DESCRIPTION OF DRAWINGS

The above and other aspects and features of the present disclosure will become more apparent by describing in detail non-limiting example embodiments thereof with reference to the attached drawings, in which:

FIG. 9 is a flowchart illustrating a method for assembling a camera mount assembly according to an embodiment of the present disclosure.

DETAILED DESCRIPTION

Figure 1A:
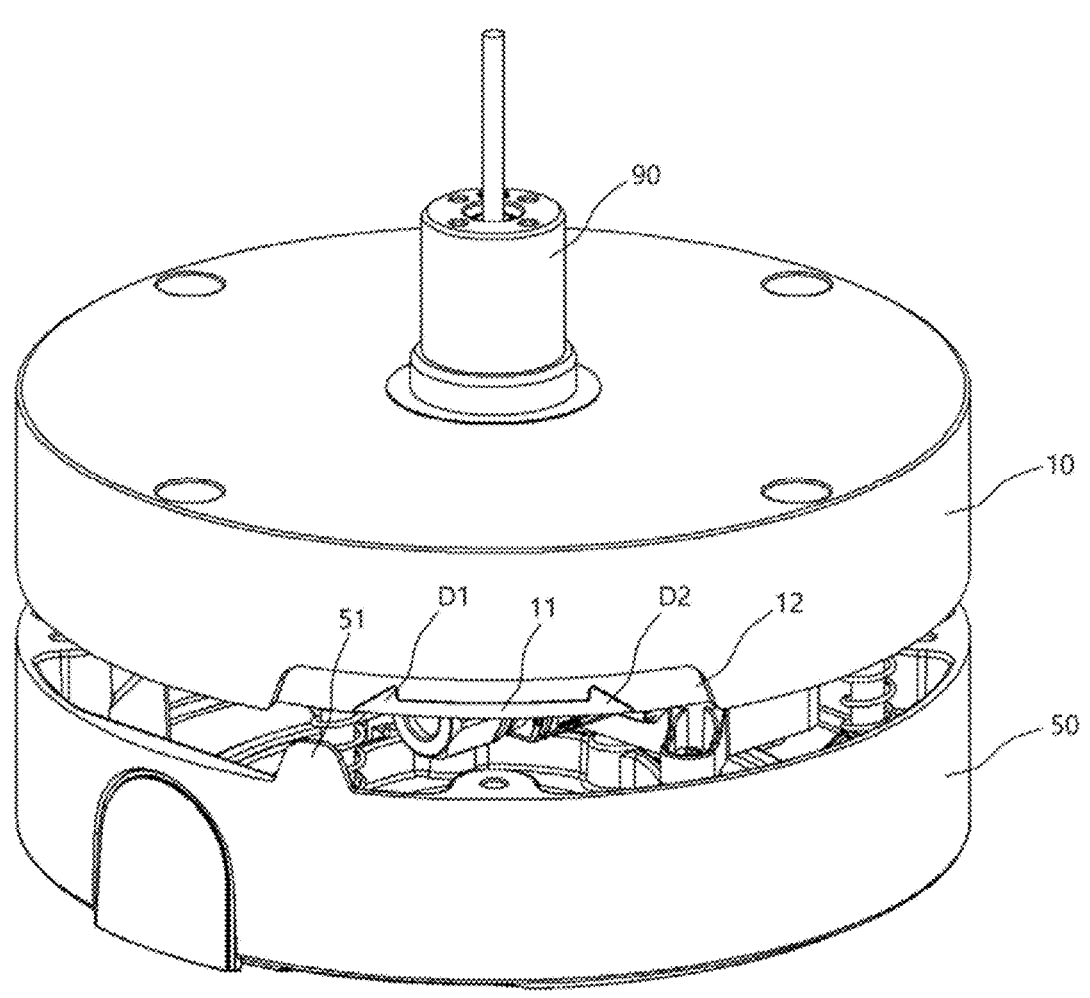
FIG. 1A is a perspective view of a camera mount assembly when the camera mount assembly is in a disassembled state.

Advantages and features of embodiments of the present disclosure, and methods according to embodiments of the present disclosure, will become apparent from the descriptions of non-limiting example embodiments below with reference to the accompanying drawings. However, the present disclosure is not limited to the example embodiments described herein and embodiments of the present disclosure may be implemented in various ways. The example embodiments are provided for making the present disclosure thorough and for fully conveying the scope of the present disclosure to those skilled in the art. Like reference numerals denote like elements throughout the descriptions.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Terms used herein are for illustrating the embodiments rather than limiting the present disclosure. As used herein, the singular forms are intended to include plural forms as well, unless the context clearly indicates otherwise. Throughout this specification, the word "comprise" and variations such as "comprises" or "comprising," will be understood to imply the inclusion of stated elements but not the exclusion of any other elements.

It will be understood that when an element is referred to as being "over," "above," "on," "below," "under," "beneath," "connected to" or "coupled to" another element, it can be directly over, above, on, below, under, beneath, connected or coupled to the other element or intervening elements may be present. In contrast, when an element is referred to as being "directly over," "directly above," "directly on," "directly below," "directly under," "directly beneath," "directly connected to" or "directly coupled to" another element, there are no intervening elements present.

Hereinafter, non-limiting example embodiments of the present disclosure will be described in detail with reference to the accompanying drawings.

Figure 1B:
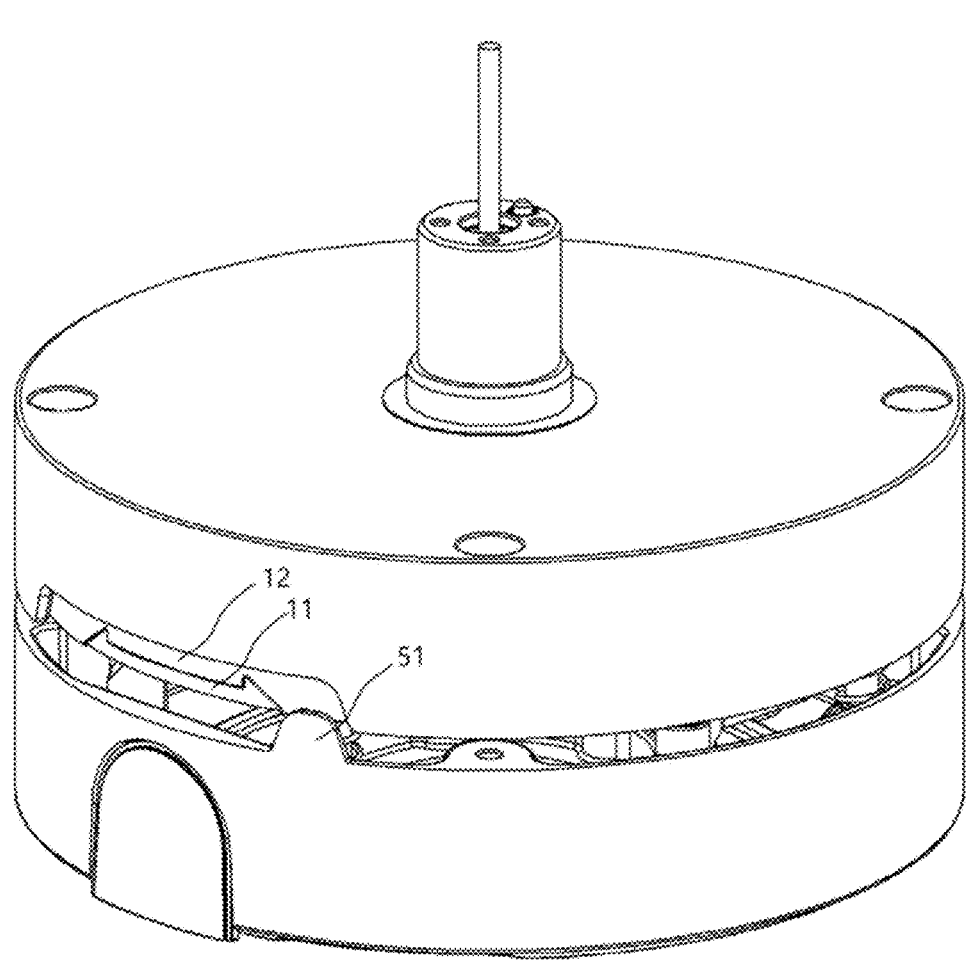
FIG. 1B is a perspective view of the camera mount assembly when the camera mount assembly is in an assembled state.
Figure 1C:
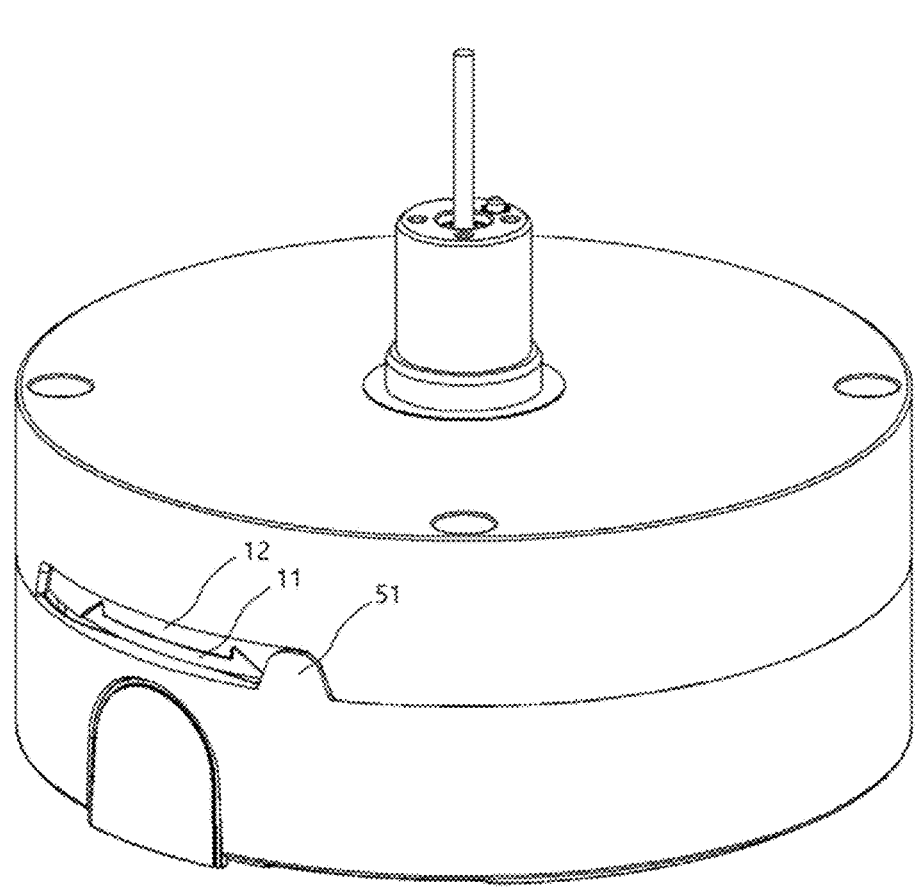
FIG. 1C is a perspective view of the camera mount assembly when a base unit and a mount unit of the camera mount assembly are fastened to each other via a fastening bolt in the assembled state.

FIG. 1A to FIG. 1C are perspective views of a camera mount assembly 100 according to an embodiment of the present disclosure.

FIG. 1A is a perspective view of the camera mount assembly 100 when the camera mount assembly 100 is in a disassembled state. FIG. 1B is a perspective view of the camera mount assembly 100 when the camera mount assembly 100 is in an assembled state. FIG. 1C is a perspective view of the camera mount assembly 100 when a base unit and a mount unit of the camera mount assembly 100 are fastened to each other via a fastening bolt 15 in the assembled state.

As shown, the camera mount assembly 100 may be configured to include a base unit 50 (also referred to as a "base") that may be fixed on a support surface, and a mount unit 10 (also referred to as a "mount") that may be coupled with a camera and may be rotatable about a common axis with respect to the base unit 50. The camera may be embodied as a camera that is coupled with a mount shaft 90 extending in an axial direction from the mount unit 10 and rotates together with the mount shaft 90 and thus supports at least a panning function. In particular, when the mount unit 10 rotates with respect to the base unit 50, a gap between the base unit 50 and the mount unit 10 may vary.

The gap between the base unit 50 and the mount unit 10 in the disassembled position as shown in FIG. 1A and the gap between the base unit 50 and the mount unit 10 in the assembled position as shown in FIG. 1B may be different from each other. The gap in the assembled position may be eventually removed by fastening the base unit 50 and the mount unit 10 to each other via a fastening bolt, and thus the base unit 50 and the mount unit 10 come into entire contact with each other as shown in FIG. 1C.

Specifically, when the mount unit 10 rotates in a first direction D1 (clockwise direction in a top view) with respect to the base unit 50, the mount unit 10 may reach an assembled position at which the mount unit 10 may be assembled with the base unit 50 (see FIG. 1B). Further, when the mount unit 10 rotates in a second direction D2 (counterclockwise in a top view) opposite to the first direction D1 with respect to the base unit 50 in the assembled position, the mount unit 10 reaches a disassembled position at which the mount unit 10 may be disassembled from the base unit 50 (see FIG. 1A).

A guide groove 12 is formed on an outer circumferential face of the mount unit 10 and extends along the outer circumferential face. Further, a protrusion 51 protruding from the outer circumferential face of the base unit 50 so as to be engageable with a portion of the guide groove 12 is formed. Accordingly, when the mount unit 10 rotates with respect to the base unit 50, the protrusion 51 moves along the guide groove 12. This protrusion 51 intuitively informs an amount of the rotation of the mount unit based on a relative position thereof with respect to the guide groove.

Further, a direction indicator 11 is formed at the guide groove 12 so that a user may recognize the first direction D1 and the second direction D2. The direction indicator 11 may allow the user to intuitively know in which direction and by which amount the mount unit 10 rotates toward the assembled position or the disassembled position.

Figure 2A:
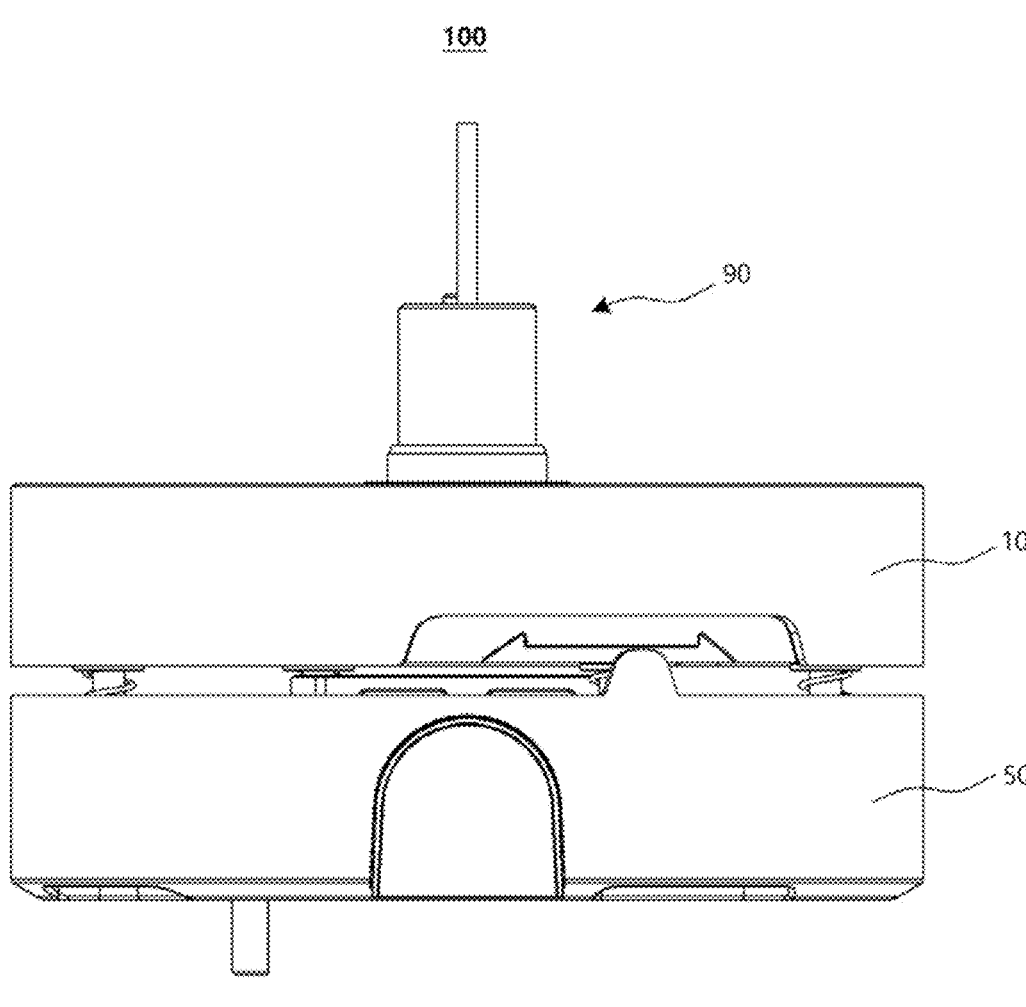
FIG. 2A shows a state in which the camera mount assembly is installed in a forward direction according to an embodiment of the present disclosure.
Figure 2B:
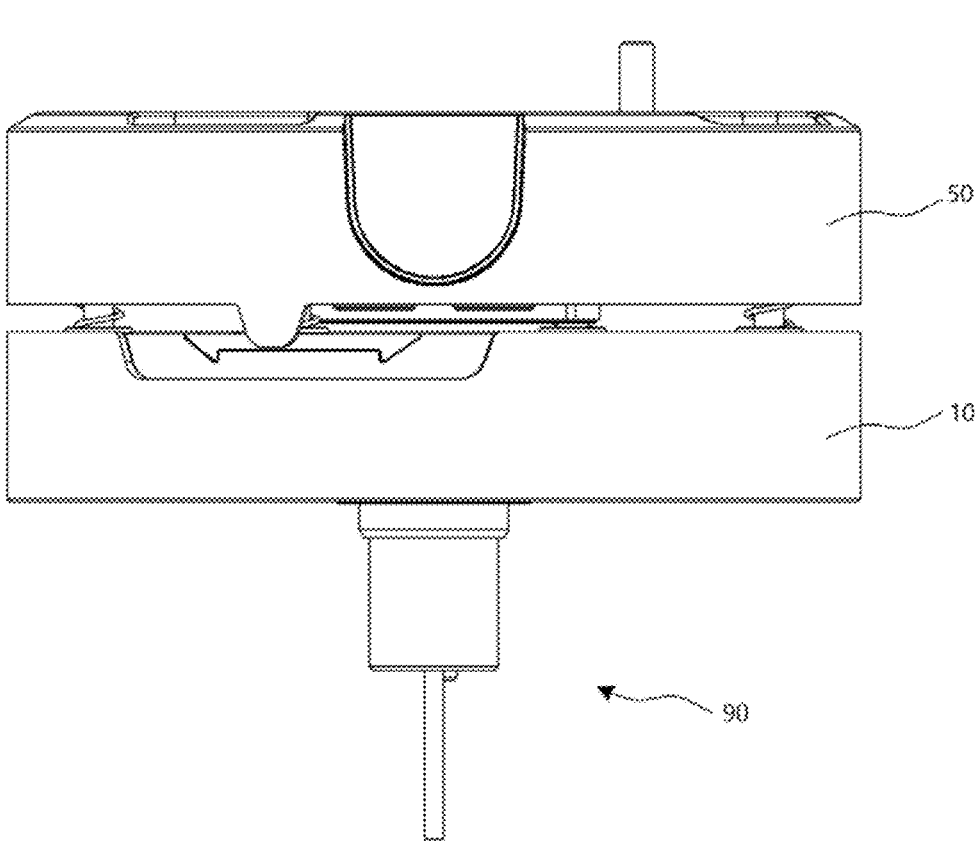
FIG. 2B shows a state in which the camera mount assembly is installed in a reverse direction according to an embodiment of the present disclosure.

FIG. 2A and FIG. 2B show a state in which the camera mount assembly 100 is installed in a forward direction and a state in which the camera mount assembly 100 is installed in a reverse direction of according to an embodiment of the present disclosure, respectively.

In the forward direction installation state as shown in FIG. 2A, the camera moves downwardly and is combined with the mount shaft 90 installed on the mount unit 10. Conversely, in the reverse direction installation state as shown in FIG. 2B, the camera moves upwardly and is combined with the mount shaft 90 installed on the mount unit 10.

A load applied to an installation person during the forward direction installation is completely different from a load applied to the installation person during the reverse direction installation.

In the forward direction installation, the installation person may only need to place the camera on the mount shaft 90 and combine the camera thereto. In this case, weights of the mount unit 10 and the base unit 50 are supported on the support surface. Thus, installation difficulty may not occur. However, in the reverse direction installation, the weights of the camera as well as the mount unit 10 and the base unit 50 may act as the load applied to the installation person.

In accordance with embodiments of the present disclosure, even before entire engagement between the mount unit 10 and the base unit 50, the mount unit 10 and the base unit 50 are spaced apart from each other by a certain gap while the mount unit 10 and the base unit 50 are partially assembled to each other. Then, a rotation of the mount unit 10 around the rotation axis, rather than a vertical movement thereof, may allow the mount unit 10 and the base unit 50 to be assembled with each other. A function of preventing the mount unit 10 and the base unit 50 from being completely removed from each other while the mount unit 10 and the base unit 50 maintain the gap therebetween as described above may be achieved by a cam bolt to be described later.

Thus, the mount unit 10 may be prevented from falling down during the installation. The installation person rotates the mount unit 10 in a direction perpendicular to the load direction rather than a load direction such that the mount unit 10 and the base unit 50 may be easily assembled with each other.

Figure 3A:
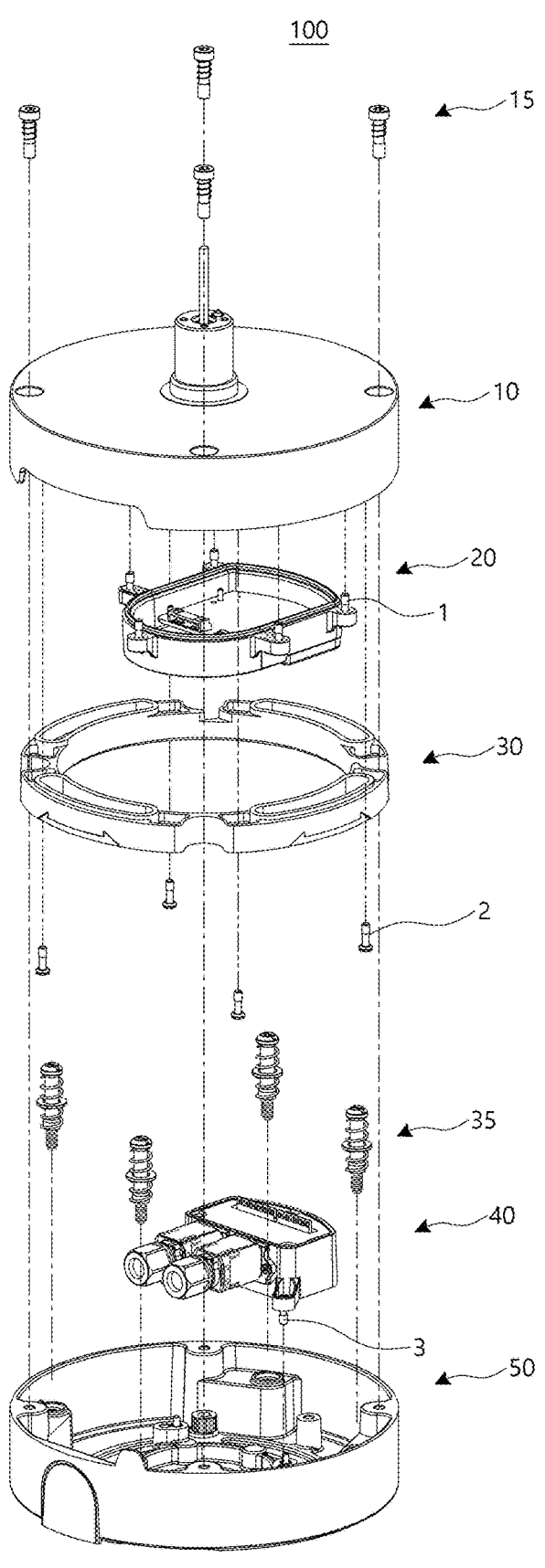
FIG. 3A is an exploded perspective view in a first view direction of the camera mount assembly according to an embodiment of the present disclosure.
Figure 3B:
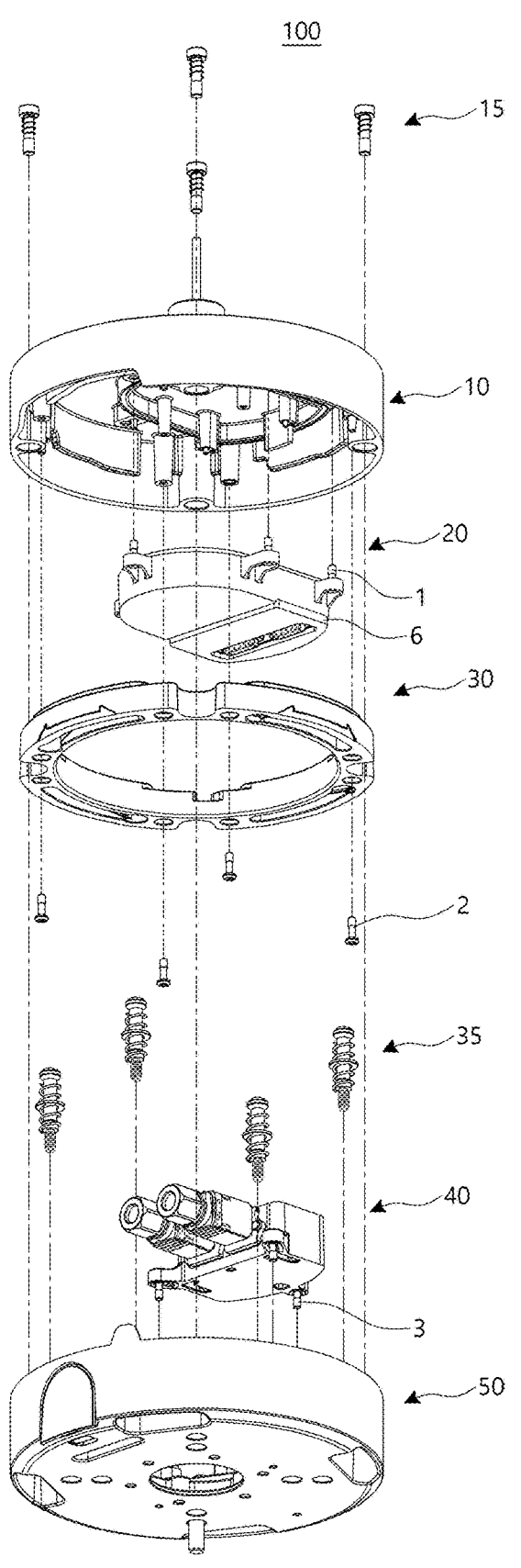
FIG. 3B is an exploded perspective view in a second view direction of the camera mount assembly according to an embodiment of the present disclosure.

FIG. 3A and FIG. 3B are exploded perspective views in different view directions of the camera mount assembly 100 according to an embodiment of the present disclosure, respectively. The camera mount assembly 100 includes the mount unit 10 and the base unit 50, as described above. Further, a guide frame 30 may be installed on either one of the mount unit 10 and the base unit 50. In embodiments of the present disclosure, an example in which the guide frame 30 is installed on the mount unit 10 is illustrated. However, embodiments of the present disclosure are not limited thereto. Conversely, a configuration in which the guide frame 30 is installed on the base unit 50 and a screw thread portion of the cam bolt is coupled to the mount unit 10 may be provided. In another example, the guide frame 30 may be formed integrally with one from among the mount unit 10 and the base unit 50, rather than being fastened to one from among the mount unit 10 and the base unit 50 via a fastener.

Hereinafter, in embodiments of the present disclosure, an example in which the guide frame 30 is installed on the mount unit 10 will be described. The guide frame 30 may be fastened to the mount unit 10 via a screw 2. In this way, the guide frame 30 is installed on the mount unit 10, while a cam bolt 35 is fixed to the base unit 50 via a screw thread.

Accordingly, when the mount unit 10 rotates with respect to the base unit 50, one side of the cam bolt 35 moves along a cam profile formed in the guide frame 30 such that the gap between the base unit 50 and the mount unit 10 varies.

Further, a first housing 40 accommodating a first circuit board therein may be fixed to the base unit 50 via a screw 3. A second housing 20 accommodating a second circuit board therein may be fixed to the mount unit 10 via a screw 1. As described above, a fastening bolt 15 fastens the mount unit 10 to the base unit 50 while the mount unit 10 is present at the assembled position on the base unit 50 in the assembled position. Thus, the gap between the mount unit 10 and the base unit 50 may be removed and close contact between the mount unit 10 and the base unit 50 may be achieved. In this regard, an edge portion of the first housing 40 also comes into contact with an edge portion of the second housing 20. In this regard, a gasket is formed on at least one from among the two edge portions so as to provide a seal that seals an inner space of each of the first housing 40 and the second housing 20 from outer air upon contact. In FIG. 3B, a gasket 6 is shown to be formed on a bottom face of the second housing 20 as an example. However, embodiments of the present disclosure are not limited thereto. The gasket may be formed on a top face of the first housing 40.

When a connector of the first housing 40 and a connector of the second housing 20 are electrically connected to each other upon the sealing, dustproofness and waterproofness at a connection portion therebetween may be provided. This is because even when the mount unit 10 and the base unit 50 are in contact with each other and are fastened to each other, the connection portion between the connectors may be separately protected since an opening may be formed in each of several positions of the mount unit 10 and the base unit 50.

Figure 4:
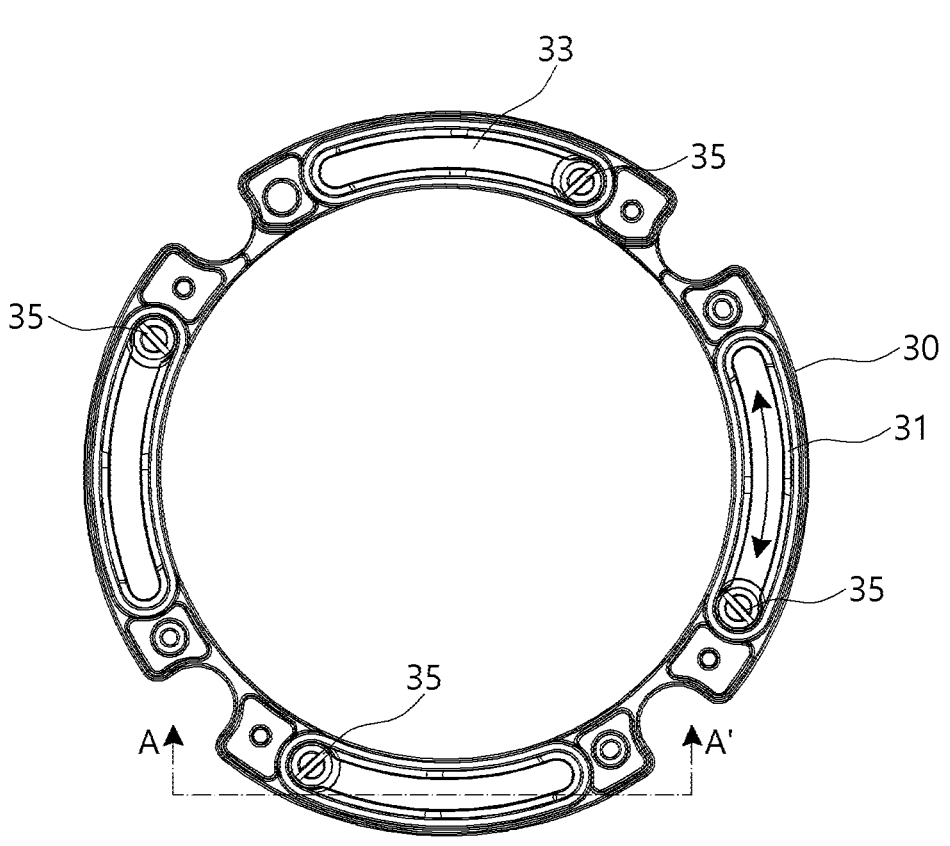
FIG. 4 is a plan view showing a state in which a cam bolt is inserted into a guide frame of the camera mount assembly.

FIG. 4 is a plan view showing a state in which the cam bolt 35 is inserted into the guide frame 30 of the camera mount assembly 100.

The guide frame 30 has a rim shape extending along a circumferential direction, and one or more the guide slot 33 is formed in a rim shape. Accordingly, while one side of the cam bolt 35, that is a cam portion to be described later, is provided in a guide slot 33, the cam bolt 35 is allowed to move within the guide slot 33. A cam profile 31 (refer to FIG. 5A) may be formed on at least one from among two inner walls defining the guide slot 33. However, according to embodiments, in order to guide the cam bolt 35 more stably, two cam profiles having the same shape may be respectively formed on both inner walls thereof.

Figure 5A:
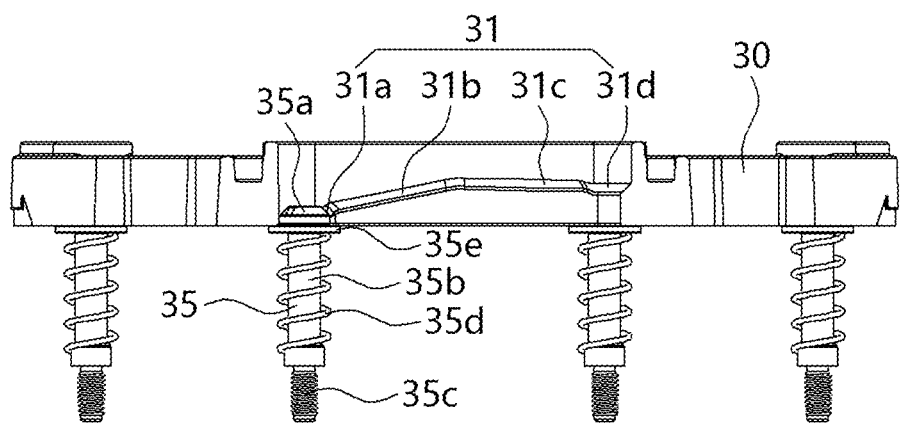
FIG. 5A is a cross-sectional view of the guide frame of FIG. 4 when the cam bolt is at a disassembled position.
Figure 5B:
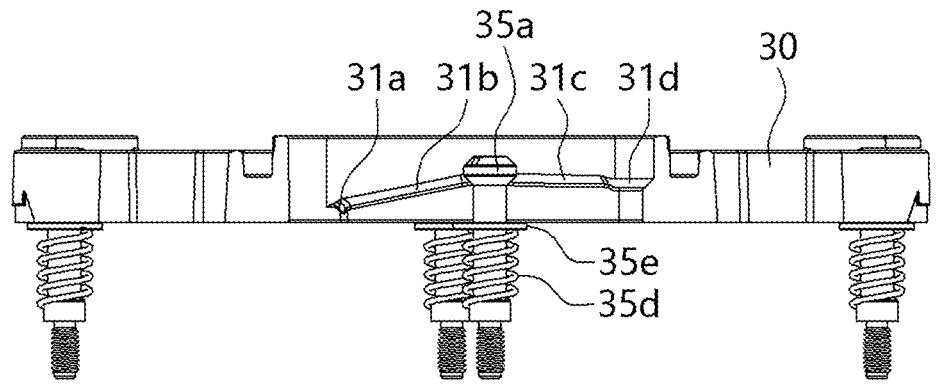
FIG. 5B is cross-sectional view of the guide frame of FIG. 4 when the cam bolt is at an intermediate position.
Figure 5C:
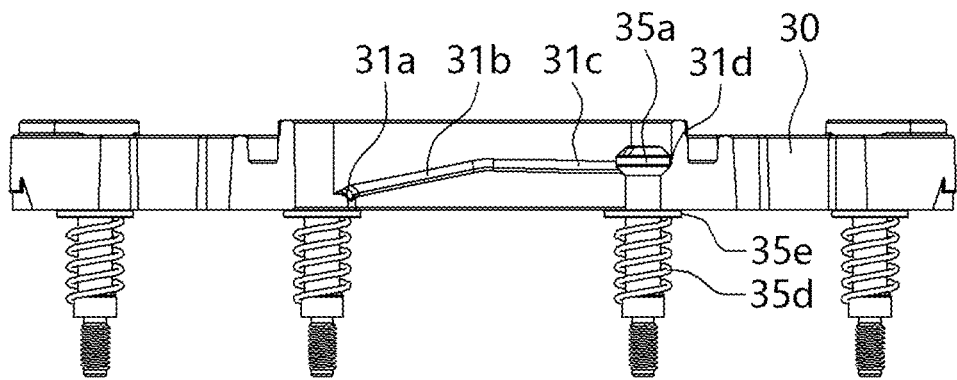
FIG. 5C is a cross-sectional view of the guide frame of FIG. 4 when the cam bolt is at an assembled position.
Figure 5D:
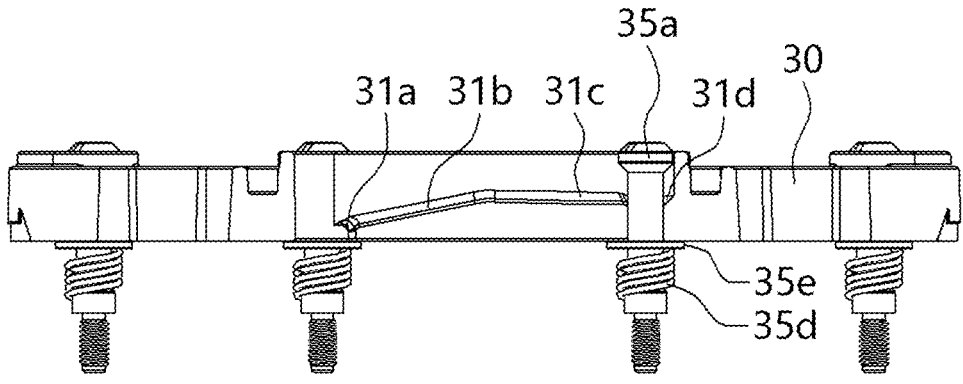
FIG. 5D is a cross-sectional view of the guide frame of FIG. 4. when the cam bolt is at the assembled position, and a mount unit and a base unit of the camera mount assembly are fastened to each other via a fastening bolt.

FIG. 5A to FIG. 5D are cross-sectional views of the guide frame 30 of FIG. 4 as taken in a A-A' direction of FIG. 4. FIG. 5A is a cross-sectional view of the guide frame 30 of FIG. 4 when the cam bolt 35 is at a disassembled position. FIG. 5B is cross-sectional view of the guide frame 30 of FIG. 4 when the cam bolt 35 is at an intermediate position. FIG. 5C is a cross-sectional view of the guide frame 30 of FIG. 4 when the cam bolt 35 is at an assembled position. FIG. 5D is a cross-sectional view of the guide frame 30 of FIG. 4. when the cam bolt 35 is at the assembled position and the mount unit 10 and the base unit 50 of the camera mount assembly 100 are fastened to each other via the fastening bolt 15.

The cam profile 31 having a changing shape is formed on the inner wall of the guide slot 33 of the guide frame 30. The cam profile 31 is composed of a lowest point position 31a corresponding to the disassembled position, an inclined ascending zone 31b that ascents in an inclined manner from the lowest point position 31a, a slope constant zone 31c with no slope change after the inclined ascending zone 31b, and a final position 31d corresponding to the assembled position and abruptly descending after the slope constant zone 31c. In particular, when a head or a cam portion 35a of the cam bolt 35 travels along the slope constant zone 31c and then instantaneously reaches the final position 31d, a click feeling is provided to the installation person. Such a sense of a click provides a function of intuitively informing the installation person who rotates the mount unit 10 that the mount unit 10 has reached the assembled position.

In this way, while the cam bolt 35 is fixed to the base unit 50, the cam portion 35a of the cam bolt 35 may ascend and descend along the cam profile 31. For example, the cam bolt 35 includes the cam portion 35a that moves while being in contact with the cam profile 31, a screw thread portion 35c fastened to the base unit 50, and a shaft 35b connecting the cam portion 35a to the screw thread portion 35c.

Further, a bias spring 35d for providing a biasing force is installed so as to surround the cam bolt 35 such that both ends of the bias spring 35d are respectively supported on a bottom face of the guide frame 30 and one side of the base unit 50.

Due to this biasing force, an elastic force may be applied to the cam bolt 35 between the mount unit 10 and the base unit 50, so that an installation person may easily rotate the mount unit 10 with respect to the base unit 50.

Further, a ring member 35e may be further included which surrounds the shaft 35b of the cam bolt 35. When the mount unit 10 rotates with respect to the base unit 50, the ring member 35e maintains contact thereof with the bottom face of the guide frame 30. In this regard, one end of the bias spring 35d is supported on the ring member 35e. That is, regardless of the rotation of the mount unit 10, the ring member 35e is positioned so as to be in close contact with the bottom face of the guide frame 30 under the elastic force of the bias spring 35d.

Figure 6A:
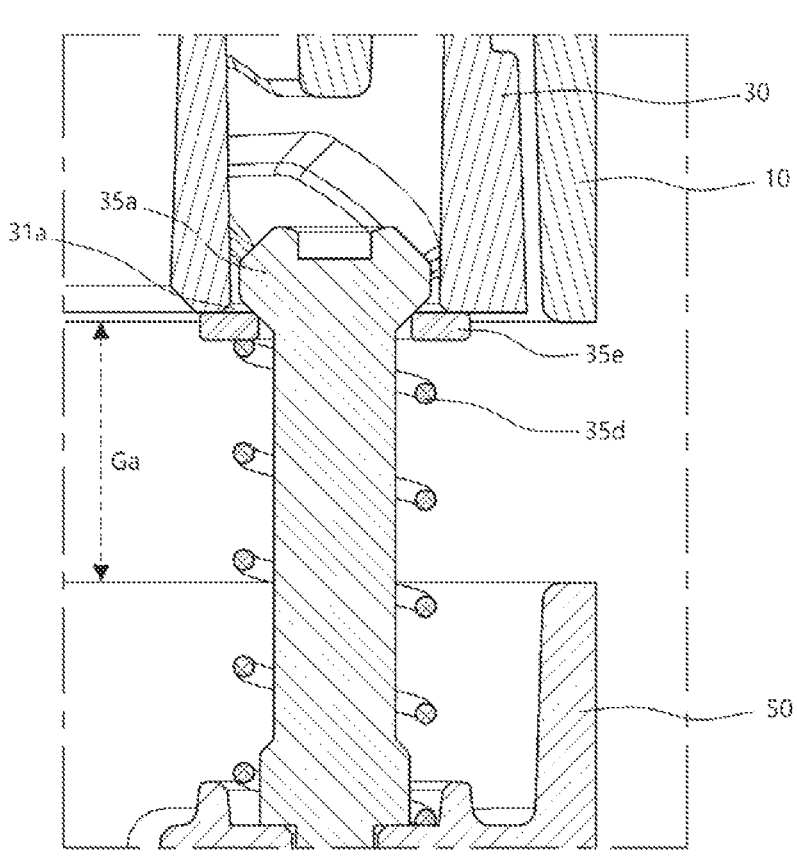
FIG. 6A shows a state in which the cam bolt is at the disassembled position.
Figure 6B:
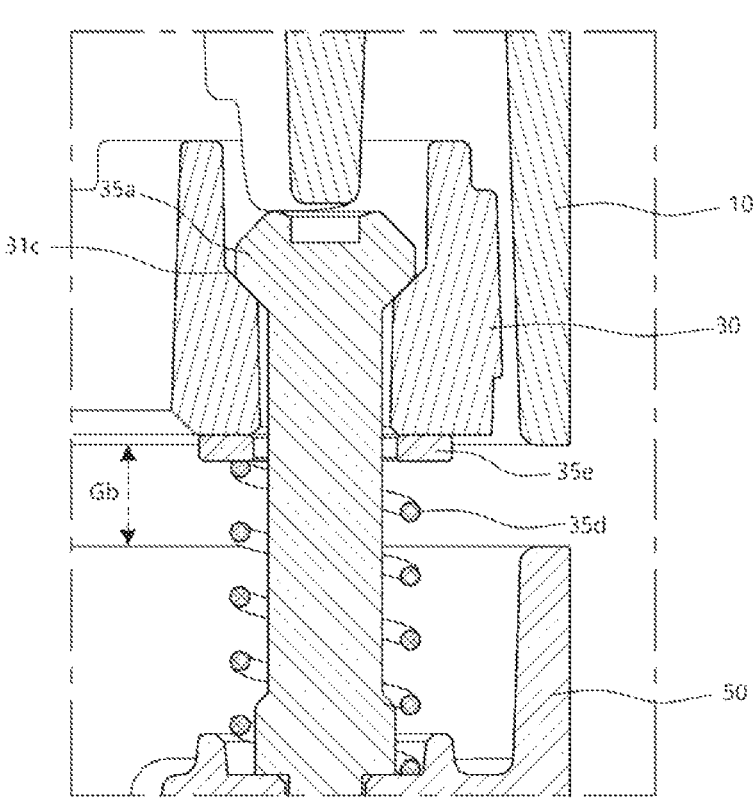
FIG. 6B shows a state in which the cam bolt is at the intermediate position.
Figure 6C:
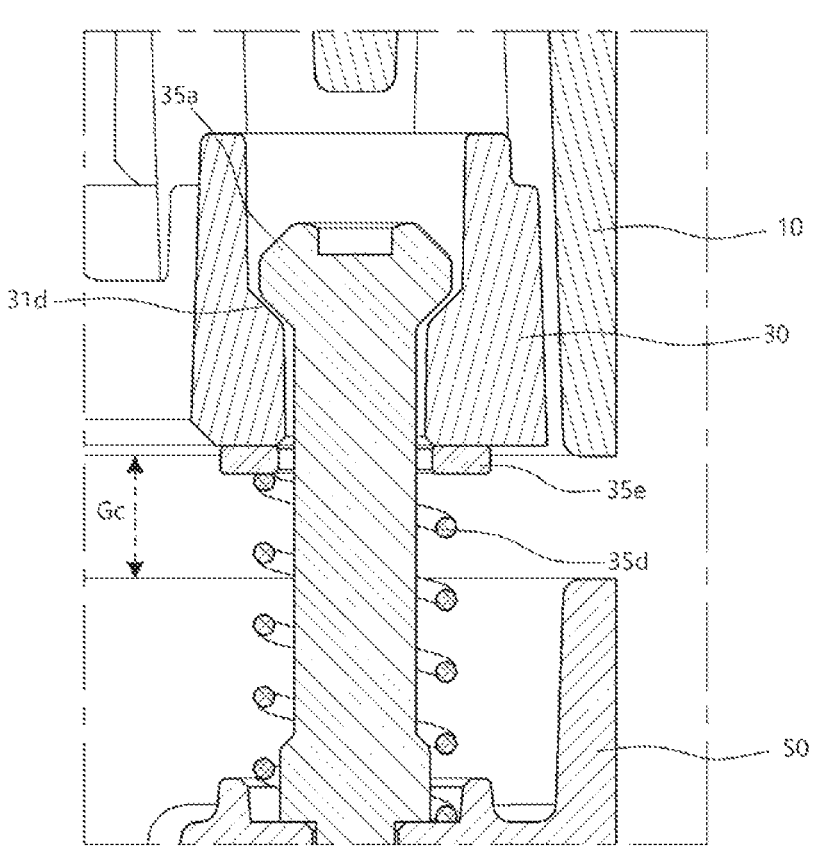
FIG. 6C shows a state in which the cam bolt is at the assembled position.
Figure 6D:
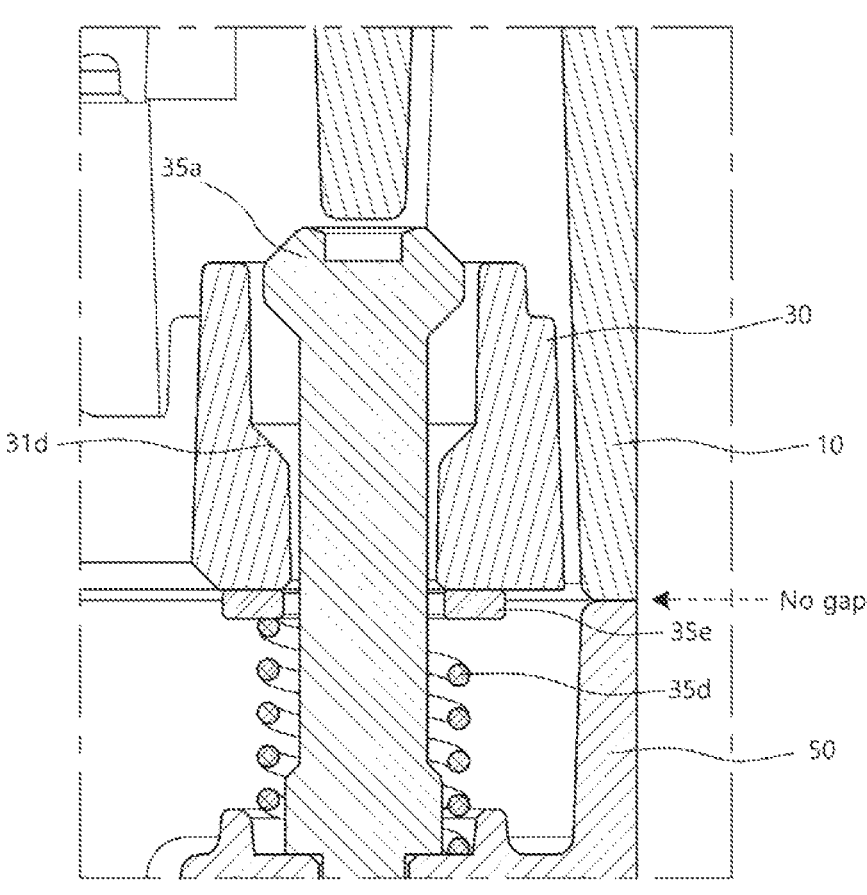
FIG. 6D shows a state in which the cam bolt is at the assembled position, and a base and mount unit of the camera mount assembly are fastened to each other via a fastening bolt.

FIG. 6A to FIG. 6D are sectional views of the camera mount assembly 100 as taken along a longitudinal direction of the cam bolt 35. FIG. 6A shows a state in which the cam bolt 35 is at the disassembled position, FIG. 6B shows a state in which the cam bolt 35 is at the intermediate position, and FIG. 6C shows a state in which the cam bolt 35 is at the assembled position. FIG. 6D shows a state in which the cam bolt 35 is at the assembled position, and the base unit 50 and the mount unit 10 of the camera mount assembly 100 are fastened to each other via the fastening bolt 15.

As shown, when the installation person rotates the mount unit 10 with respect to the base unit 50, the cam portion 35a may ascend in an inclined manner and then abruptly descend while moving along the cam profile 31, such that the gap between the mount unit 10 and the base unit 50 varies. Structurally, the gap between the mount unit 10 and the base unit 50 decreases as a vertical level of a point of the cam profile 31 which the cam portion 35a contacts is higher. Similarly, the gap between the mount unit 10 and the base unit 50 increases as the vertical level of a point of the cam profile 31 which the cam portion 35a contacts is lower.

Figure 7A:
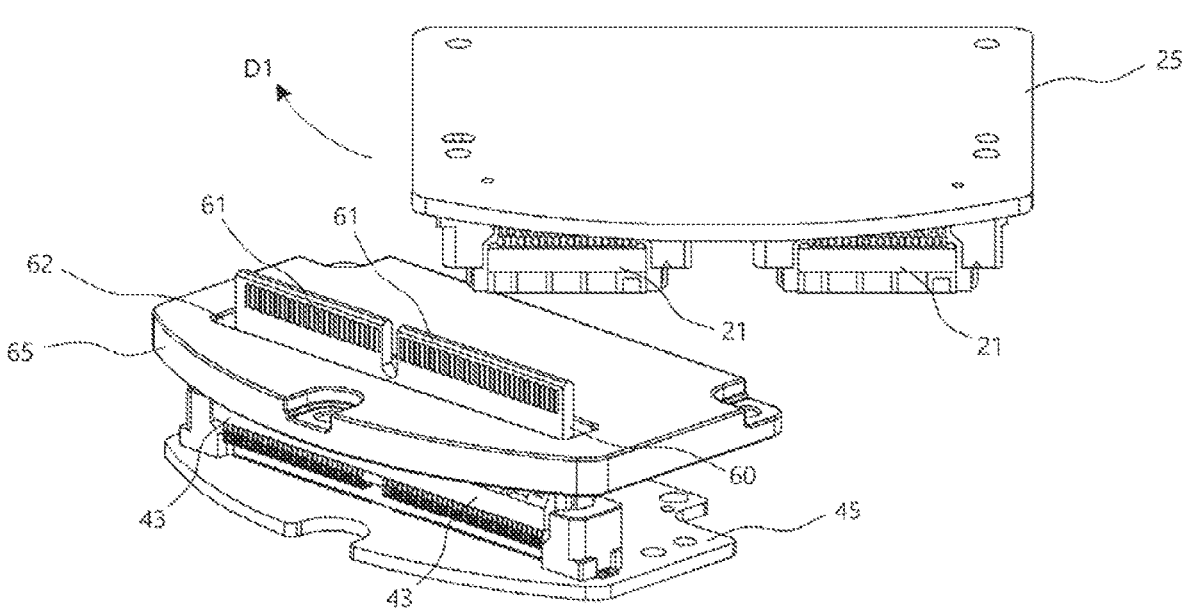
FIG. 7A shows a state in which the cam bolt is at the disassembled position.
Figure 7B:
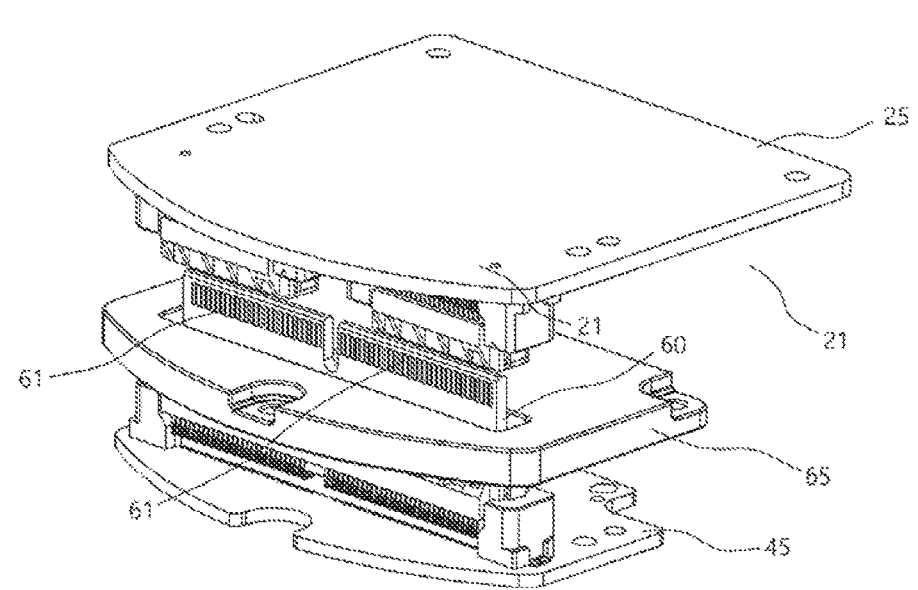
FIG. 7B shows a state in which the cam bolt is at the assembled position.
Figure 7C:
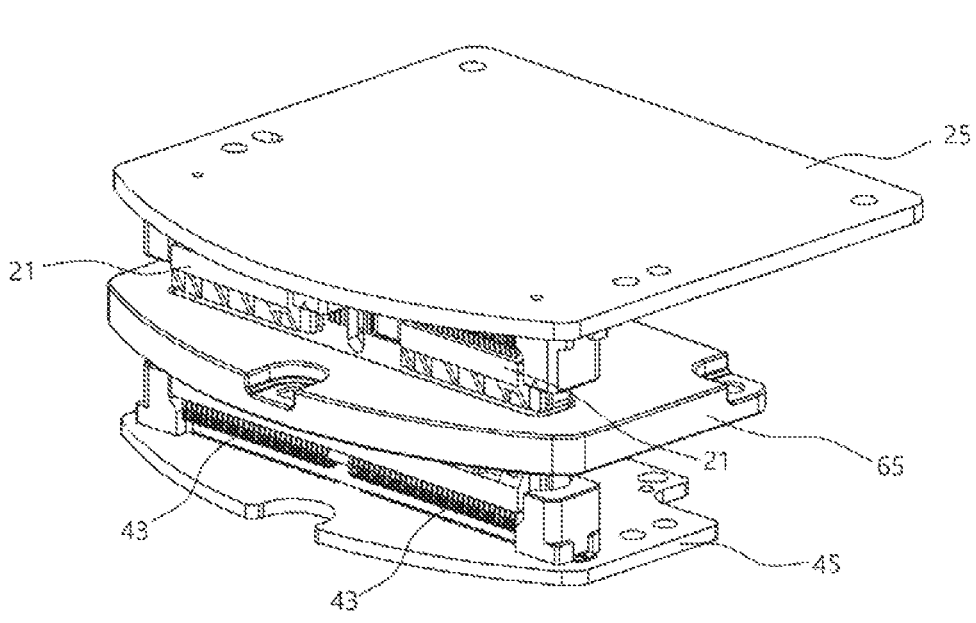
FIG. 7C shows a state in which the cam bolt is at the assembled position, and a base unit and a mount unit of the camera mount assembly are fastened to each other via a fastening bolt.

Accordingly, a gap Ga is the largest when the cam portion 35a is at the lowest point position 31a of the cam profile 31 corresponding to the disassembling position. A gap Gb is the smallest when the cam portion 35a is at any one point of the slope constant zone 31c of the cam profile 31. A gap Gc is slightly larger than the gap Gb when the cam portion 35a is at the final position 31d of the cam profile 31 corresponding to the assembled position. In this way, the gap Gc corresponds to a preliminary assembly state between the mount unit 10 and the base unit 50. Thereafter, when the mount unit 10 and the base unit 50 are fastened to each other via the fastening bolt 15, the gap may be removed as shown in FIG. 6. Thus, a completely assembled state may be achieved. That is, the mount unit 10 and the base unit 50 are in close contact with each other. FIG. 7A to FIG. 7C are respective perspective views showing relative positions of a first circuit board 45 and a second circuit board 25. FIG. 7A shows a state in which the cam bolt 35 is at the disassembled position, FIG. 7B shows a state in which the cam bolt 35 is at the assembled position, and FIG. 7C shows a state in which the cam bolt 35 is at the assembled position, and the base unit 50 and the mount unit 10 of the camera mount assembly 100 are fastened to each other via the fastening bolt 15.

As described above, the first circuit board 45 is housed in the first housing 40, and the second circuit board 25 is housed in the second housing 20. However, in FIG. 7A to FIG. 7C, the first housing 40 and the second housing 20 are omitted for purposes of clarity.

Referring to FIG. 7A to FIG. 7C, the first circuit board 45 includes a first connector 43 providing an electrical connection to the first circuit board 45, and the second circuit board 25 includes a second connector 21 that provides an electrical connection to the second circuit board 25.

At the disassembled position, the first connector 43 and the second connector 21 are not aligned with each other as shown in FIG. 7A. Further, at the assembled position, the first connector 43 and the second connector 21 are aligned with each other but are not electrically connected to each other as shown in FIG. 7B. Then, when, at the assembled position, the mount unit 10 and the base unit 50 are fastened to each other via the fastening bolt 15, as shown in FIG. 7C, the first connector 43 and the second connector 21 are electrically connected to each other.

In this regard, the first connector 43 and the second connector 21 may be electrically connected to each other via a pin plate 60 disposed between the first connector 43 and the second connector 21. In this regard, the pin plate 60 may be fixedly disposed in an opening 62 of an intermediate plate 65. A first pin 63 (refer to FIGS. 8A-C) and a second pin 61 are respectively formed at a lower end and an upper end of the pin plate 60. When the first connector 43 is connected to the first pin 63 and the second connector 21 is connected to the second pin 61, the first circuit board 45 and the second circuit board 25 are electrically connected to each other.

Figure 8A:
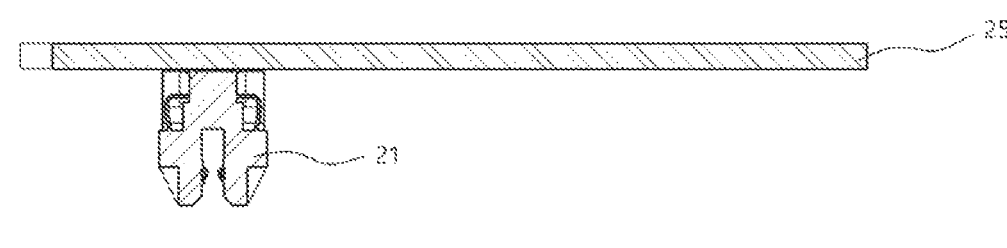
FIG. 8A shows a state in which the cam bolt is at the disassembled position.
Figure 8A:
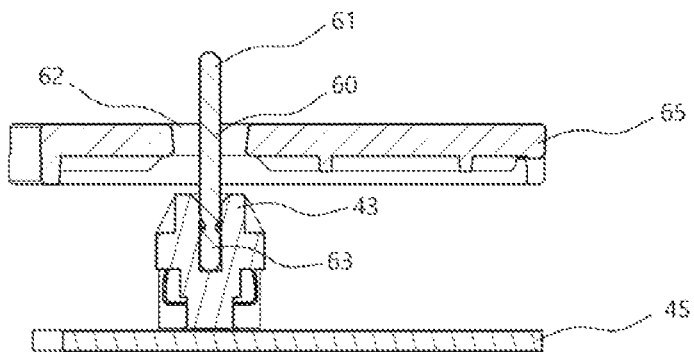
Figure 8B:
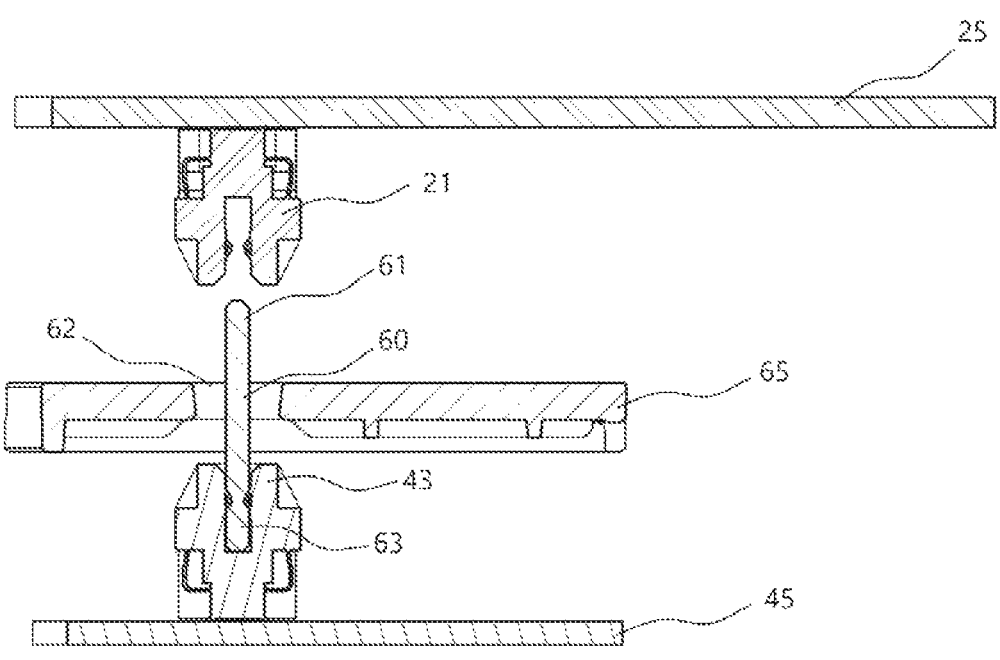
FIG. 8B shows a state in which the cam bolt is at the assembled position.
Figure 8C:
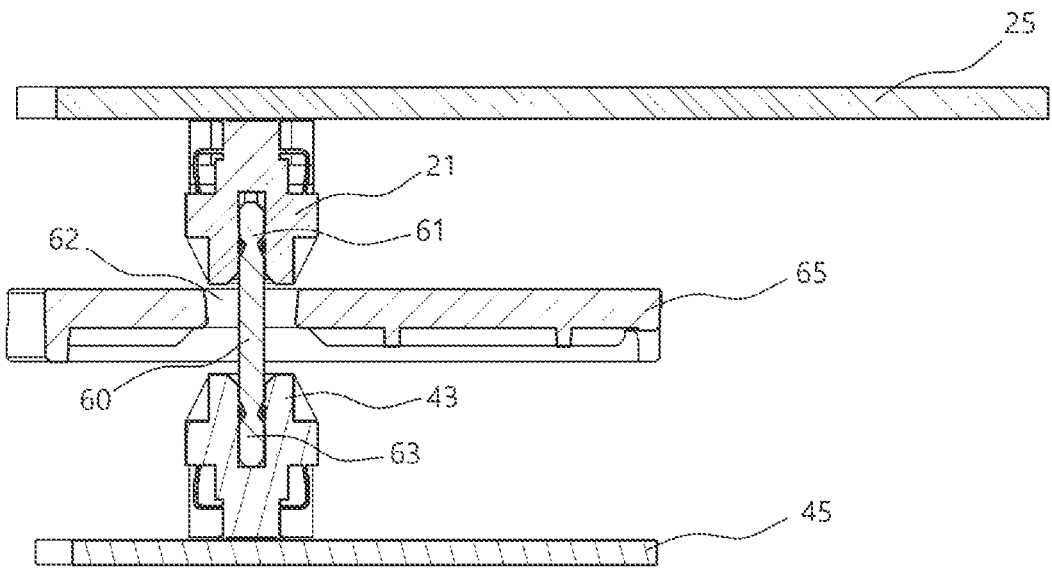
FIG. 8C shows a state in which the cam bolt is at the assembled position, and a base unit and a mount unit of the camera mount assembly are fastened to each other via a fastening bolt.

FIG. 8A to FIG. 8C are longitudinal cross-sectional views showing the relative positions of the first circuit board 45 and the second circuit board 25. FIG. 8A shows a state in which the cam bolt 35 is at the disassembled position, FIG. 8B shows a state in which the cam bolt 35 is at the assembled position, and FIG. 8C shows a state in which the cam bolt 35 is at the assembled position, and the base unit 50 and the mount unit 10 of the camera mount assembly 100 are fastened to each other via the fastening bolt 15.

Referring to FIG. 8A to FIG. 8C, for example, the pin plate 60 is coupled to the first connector 43. Then, the base unit 50 and the mount unit 10 are fastened to each other via the fastening bolt 15 such that the pin plate 60 is connected to the second connector 21, so that the first connector 43 and the second connector 21 may be electrically connected to each other.

As shown in FIG. 8C, when the base unit 50 and the mount unit 10 are fastened to each other via the fastening bolt 15, the first circuit board 45 and the second circuit board 25 are electrically connected to each other. In this regard, an area in which the first connector 43 and the second connector 21 are connected to each other is screened so as not to be exposed to an environment outside of the first housing 40 and the second housing 20, thereby providing a waterproof/dustproof function. This function may be achieved when the first housing 40 and the second housing 20 come into contact with each other in the state shown in FIG. 8C, and the contact portion is sealed with at least one gasket (e.g., gasket 6 in FIG. 3B).

FIG. 9 is a flowchart illustrating a method for assembling a camera mount assembly according to an embodiment of the present disclosure.

First, the first circuit board 45 is inserted into (e.g., accommodated in) the base unit 50 that may be fixedly disposed on the support surface in step S91. Further, the second circuit board 25 is inserted into (e.g., accommodated in) the mount unit 10 that may be coupled to the camera and is rotatable with respect to the base unit 50 and around the common axis in step S92.

Then, the guide frame 30 is installed on the mount unit 10 in step S93. Then, the cam bolt 35 is fixed to the base unit 50 while the cam bolt 35 is inserted into the guide slot 33 formed in the guide frame 30 in step S94.

Thereafter, the installation person rotates the mount unit 10 in the first direction D1 with respect to the base unit 50 in step S95. During this rotating step, one side of the cam bolt 35 moves along the cam profile 31 formed in the guide frame 30 so that the gap between the base unit 50 and the mount unit 10 varies in step S96.

The mount unit 10 rotates to reach the preliminary assembly position. Then, the mount unit 10 and the base unit 50 are fastened to each other via the fastening bolt 15 in step S97. In the preliminary assembled state, a gap is formed between the mount unit 10 and the base unit 50, and then the gap is removed when fastening the mount unit 10 and the base unit 50 to each other with the fastening bolt 15, thereby achieving a completely assembled state.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific example embodiments described herein.

What is claimed is:

1. A camera mount assembly comprising:
a base configured to be fixed to a support surface, wherein the base comprises a first circuit board therein;
a mount configured to have a camera mounted thereon, wherein the mount is further configured to rotate about a common axis with respect to the base, and comprises a second circuit board therein;
a guide frame on one from among the mount and the base, the guide frame comprising a cam profile; and
a cam bolt fixed to the other from among the mount and the base, wherein, based on the mount rotating with respect to the base, one side of the cam bolt is configured to move along the cam profile formed in the guide frame such that a size of a gap between the base and the mount varies,
wherein the camera mount assembly has an assembled position at which the mount is configured to be assembled to the base and a disassembled position at which the mount is configured to be disassembled from the base,
wherein the assembled position is a position at which the mount and the base are in a preliminary assembly state in which the gap is present between the base and the mount, and
wherein, while at the assembled position, the mount and the base are configured to be fastened to each other via a fastening bolt, such that the gap between the base and the mount is removed, thereby achieving a completely assembled state.

2. The camera mount assembly of claim 1, wherein, based on the mount rotating in a first direction with respect to the base, the mount reaches the assembled position, and
wherein, based on the mount rotating in a second direction opposite to the first direction, the mount reaches the disassembled position.

3. The camera mount assembly of claim 2, wherein the guide frame is fastened to the mount via a screw.

4. The camera mount assembly of claim 3, wherein the cam bolt comprises:
a cam portion configured to move while in contact with the cam profile;
a screw thread portion fastened to the base; and
a shaft portion connecting the cam portion and the screw thread portion to each other.

5. The camera mount assembly of claim 4, wherein the camera mount assembly further comprises a bias spring that surrounds the cam bolt such that both ends of the bias spring are supported on a bottom face of the guide frame and one side of the base, respectively,
wherein the bias spring is configured to provide a biasing force to the base and the guide frame such that, when the mount rotates with respect to the base during at least one portion of rotation of the mount, the gap between the mount and the base is maintained due to the biasing force.

6. The camera mount assembly of claim 5, wherein the camera mount assembly further comprises a ring member surrounding the shaft portion of the cam bolt, the ring member configured to maintain in contact with the bottom face of the guide frame when the mount rotates with respect to the base, and
wherein one end of the bias spring is supported on the ring member.

7. The camera mount assembly of claim 2, wherein a guide groove is formed on an outer circumferential face of the mount and extends along the outer circumferential face, and a protrusion is formed on an outer circumferential face of the base, and
wherein the protrusion is configured to move along the guide groove based on the mount rotating with respect to the base, such that the protrusion visually indicates an amount of rotation of the mount.

8. The camera mount assembly of claim 7, wherein a direction indicator is formed at the guide groove and indicates the first direction and the second direction.

9. The camera mount assembly of claim 2, wherein the first circuit board comprises a first connector configured to provide an electrical connection to the first circuit board, the second circuit board comprises a second connector configured to provide an electrical connection to the second circuit board, wherein, based on the mount being at the disassembled position, the first connector and the second connector are misaligned with each other, wherein, based on the mount being at the assembled position, the first connector and the second connector are aligned with each other but are not electrically connected to each other, and wherein, based on the mount being at the assembled position, and the mount and the base are fastened to each other via a the fastening bolt, the first connector and the second connector are electrically connected to each other.

10. The camera mount assembly of claim 9, wherein the first circuit board is fixed to the base and is housed in a first board housing, and the second circuit board is fixed to the mount and is housed in a second board housing.

11. The camera mount assembly of claim 10, wherein a gasket is formed on at least one from among the first board housing and the second board housing, and wherein, based on the mount and the base being fastened to each other by the fastening bolt, the first board housing and the second board housing are brought into in close contact with each other, with the gasket therebetween, such that the gasket prevents the first connector and the second connector from being exposed to an environment outside of the first board housing and the second board housing.

12. The camera mount assembly of claim 9, wherein the first connector and the second connector are configured to be electrically connected to each other via a pin plate disposed between the first connector and the second connector.

13. The camera mount assembly of claim 12, wherein, based on the mount and the base being fastened to each other by the fastening bolt, the pin plate becomes connected to the second connector such that the first connector and the second connector become electrically connected to each other.

14. The camera mount assembly of claim 1, wherein the guide frame comprises a rim shape extending along a circumferential direction of the camera mount assembly, and a guide slot within the rim shape, and wherein a cam portion of the cam bolt is within the guide slot and configured to move within the guide slot.

15. The camera mount assembly of claim 14, wherein the cam profile is formed on at least one from among two inner walls that define the guide slot.

16. The camera mount assembly of claim 15, wherein the cam profile comprises:

a lowest point position corresponding to the disassembled position at which the mount is configured to be disassembled from the base;

an inclined ascending zone extending in an inclined, ascending manner from the lowest point position;

a slope constant zone extending after the inclined ascending zone and having a constant slope; and a final position corresponding to the assembled position at which the mount is configured to be completely assembled to the base, the final position extending in an abruptly descending manner from the slope constant zone.

17. The camera mount assembly of claim 15, wherein based on the cam portion moving within the cam profile to a higher position of the cam profile, the gap between the mount and the base becomes smaller.

18. A method for assembling a camera mount assembly, the method comprising:

inserting a first circuit board into a base, wherein the base is configured to be fixed to a support surface;

inserting a second circuit board into a mount, wherein the mount is configured to have a camera mounted thereon and the mount is configured to rotate about a common axis with respect to the base;

installing a guide frame on the mount;

fixing a cam bolt to the base and inserting the cam bolt into a guide slot formed in the guide frame; and rotating the mount in a first direction with respect to the base, wherein, during the rotating, one side of the cam bolt moves along a cam profile formed in the guide frame such that a size of a gap between the base and the mount varies, wherein the method further comprises fastening the mount and the base to each other via a fastening bolt after the mount is rotated to a preliminary assembly state, wherein the gap is present between the mount and the base in the preliminary assembly state, and wherein, based on the mount and the base being fastened to each other via the fastening bolt, the gap is removed, thereby achieving a completely assembled state.

\* \* \* \* \*